United States Patent
Jacob (10) Patent No.: US 7,856,252 B2
(45) Date of Patent: Dec. 21, 2010

(54) METHOD FOR SEAMLESS NOISE SUPPRESSION ON WIDEBAND TO NARROWBAND CELL SWITCHING

(75) Inventor: Naveen Jacob, Bangalore (IN)

(73) Assignee: Agere Systems Inc., Allentown, PA (US)

( * ) Notice: Subject to any disclaimer, the term of this patent is extended or adjusted under 35 U.S.C. 154(b) by 580 days.

(21) Appl. No.: 11/934,494

(22) Filed: Nov. 2, 2007

(65) Prior Publication Data

US 2009/0116637 A1    May 7, 2009

(51) Int. Cl.
*H04M 1/00*   (2006.01)
*H04B 1/38*   (2006.01)
(52) U.S. Cl. .................. 455/570; 455/550.1; 455/73
(58) Field of Classification Search ............. 455/552.1, 455/553.1, 570.73, 550.1
See application file for complete search history.

(56) References Cited

U.S. PATENT DOCUMENTS

| | | | |
|---|---|---|---|
| 4,630,304 A * | 12/1986 | Borth et al. ............... | 381/94.3 |
| 5,884,194 A * | 3/1999 | Shiraki ...................... | 455/570 |
| 5,903,819 A * | 5/1999 | Romesburg ................ | 455/63.1 |
| 6,035,048 A | 3/2000 | Diethorn | |
| 6,181,794 B1 * | 1/2001 | Park et al. ............. | 379/406.08 |
| 7,171,246 B2 * | 1/2007 | Mattila et al. ............. | 455/570 |
| 7,477,682 B2 * | 1/2009 | LeBlanc .................... | 375/222 |
| 2010/0056227 A1 * | 3/2010 | Hayakawa et al. .......... | 455/570 |

* cited by examiner

*Primary Examiner*—Tilahun Gesesse (57) ABSTRACT

A method for seamless noise suppression on wideband to narrowband cell switching is described. In one embodiment the method includes applying noise suppression to a telephone signal using a first noise suppressor while operating a telephone in a first operating mode, the first noise suppressor generating an estimate of a noise components of the telephone signal; switching the telephone from the first operating mode to a second operating mode; providing the estimate of the noise component as an input to a second noise suppressor different from the first noise suppressor, when the switching step is performed; and applying noise suppression to the telephone signal using the second noise suppressor by using the estimate of the noise component provided by the first noise suppressor when the switching step is performed.

23 Claims, 6 Drawing Sheets

METHOD FOR SEAMLESS NOISE SUPPRESSION ON WIDEBAND TO NARROWBAND CELL SWITCHING

FIELD OF THE INVENTION

The invention relates to signal processing and more specifically it relates to signal processing in cellular telephones when switching across different networks.

BACKGROUND

Conventional wireless telephones use what is commonly referred to as encoder/decoder technology. The transmit path of a wireless telephone encodes an audio signal picked up by a microphone onboard the wireless telephone. The encoded audio signal is then transmitted to another telephone. However, prior to being encoded, the audio signal is typically processed to reduce the amount of ambient noise that will be transmitted and eventually heard by a user of the far-end telephone.

In order to process the audio signal, the audio signal that is picked up by the microphone is first converted from an analog signal to a digital signal by using an analog-to-digital converter. Once converted to a digital form, the audio signal is further processed using a noise suppression algorithm. Many noise suppression algorithms use a discrete Fourier transform (DFT) to approximate the magnitude of the audio signal at various frequencies. The noise suppression algorithms use the results of the DFT to determine the signal-to-noise ratio (SNR) for the various frequencies which make up the audio signal. Once the SNR has been calculated, the signal magnitude in each of the frequency bins is attenuated in accordance with the SNR to remove the ambient noise from the audio signal. After the audio signal has been cleaned or had the noise filtered out, it is transmitted to a far-end telephone where it is processed and presented to a user of the far-end telephone.

As the length of the telephone call increases, the noise suppression algorithm is able to more accurately predict the level of noise present in the audio signal picked up by the microphone as the noise estimates are based on a larger sample of data. Accordingly, when the telephone call is initially placed, there is typically a delay before the noise is accurately filtered out by the noise suppression algorithm since the algorithm has little or no data with which it determines the SNR. Similarly, when a cellular telephone switches from one network to another, the switching operation may require the noise suppression algorithm to restart because of the different configurations of the first and second networks. Accordingly, the restarting of the noise suppression algorithm may result in an increase in the amount of ambient noise that is heard by the far-end user as the noise suppression algorithm restarts and begins gathering data. This increase in noise may occur even though the ambient noise in the environment in which the near-end user is speaking remains relatively constant.

Thus, an improved method of noise suppression for wireless telephones switching from one network to another is desired.

SUMMARY OF THE INVENTION

A method for seamless noise suppression on wideband to narrowband cell switching is described. In one embodiment the method includes applying noise suppression to a telephone signal using a first noise suppressor while operating a telephone in a first operating mode, the first noise suppressor generating an estimate of a noise components of the telephone signal; switching the telephone from the first operating mode to a second operating mode; providing the estimate of the noise component as an input to a second noise suppressor different from the first noise suppressor, when the switching step is performed; and applying noise suppression to the telephone signal using the second noise suppressor by using the estimate of the noise component provided by the first noise suppressor when the switching step is performed.

DETAILED DESCRIPTION

Figure 1:
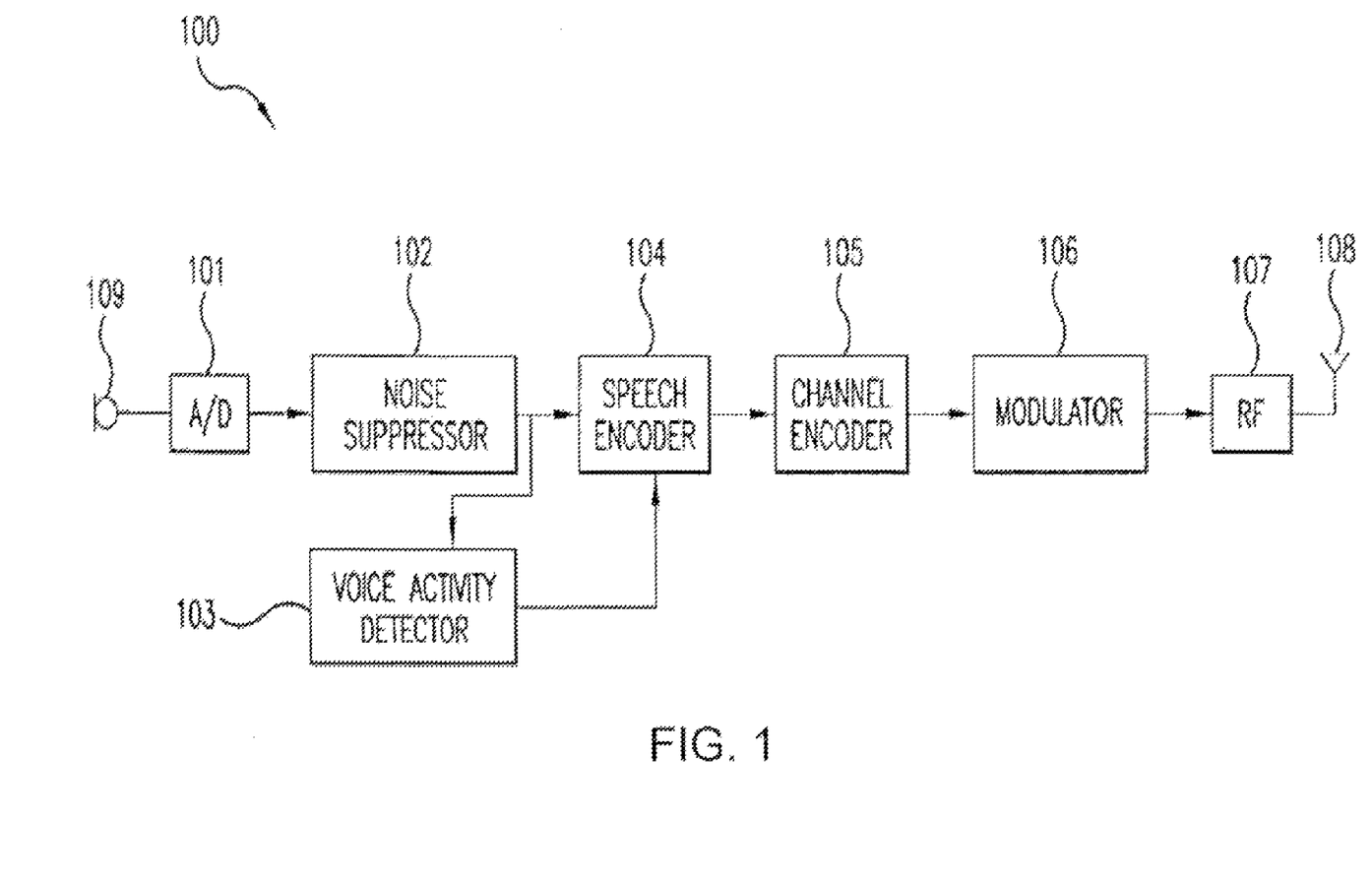
FIG. 1 is a functional block diagram of a transmit path of a conventional second generation digital wireless telephone.

FIG. 1 is a functional block diagram of a transmit path 100 of a conventional second generation (2G) digital wireless telephone, such as a cell phone. Transmit path 100 includes a microphone 109, an analog-to-digital (A/D) converter 101, a noise suppressor 102, a voice activity detector (VAD) 103, a speech encoder 104, a channel encoder 105, a modulator 106, a radio frequency (RF) module 107, and an antenna 108.

Microphone 109 receives the speech of a near-end user and outputs a corresponding audio signal. This audio signal typically includes both a speech component and an ambient noise component. The A/D converter 101 converts the audio signal from an analog to a digital form, which is then processed by noise suppressor 102.

Noise suppressor 102 performs a noise suppression algorithm on the digital audio signal received from A/D converter 101. The noise suppression algorithm typically works by spectral estimation of both the noisy-signal envelope, which comprises both a speech component and an ambient noise component, and the noise envelope that includes only ambient noise. The spectrum of the noisy-signal envelope is estimated while a telephone user speaks into microphone 109, and the spectrum of the noise signal envelope is estimated while the telephone user is not speaking.

The noise suppression algorithm may implement one of a variety of transforms known in the art, such as a discrete Fourier transform (DFT), a Hartley transform, and a bilinear-transform that maps data to Bark frequency scale. These transforms generate coefficients that are used to compute the signal to noise ratio (SNR) of particular frequencies, which is then used to attenuate the noise present in the speech signal received by microphone 109. When a telephone call begins, the speech estimate coefficient is initialized at zero and the noise estimate is set to a predetermined default value. These initial values are used by the noise suppression algorithm, which then begins making real-time noise estimates. As the phone call continues, the coefficients of the transform and the SNR become more accurate as the noise suppression algorithm has more data to utilize in generating the estimates. The noise suppression algorithm then utilizes the SNR to attenuate the signals in the various frequency bins comprising the complete audio signal. The result is a clean audio signal containing less ambient noise.

The cleaned audio signal is output from noise suppressor 102 and is converted into a channel index by speech encoder 104. The particular format that speech encoder 104 uses to encode the signal is dependent upon the type of technology being used. For example, the signal may be encoded in formats that comply with GSM (Global Standard for Mobile Communication), CDMA (Code Division Multiple Access), or other technologies commonly used for telecommunication. For the sake of brevity, these different encoding formats are not discussed in further detail.

As shown in FIG. 1, VAD 103 also receives the output of noise suppressor 102. VAD 103 uses algorithms to analyze the audio signal output by noise suppressor 102 and determine when the user is speaking. VAD 103 typically operates on a frame-by-frame basis to generate a signal that indicates whether or not a frame includes voice content. The VAD signal is provided to speech encoder 104, which uses the signal to determine how best to process the frame. For example, if VAD 103 indicates that a frame does not include voice content, speech encoder 103 may skip the encoding of the frame entirely.

Channel encoder 105 is employed to reduce bit errors that can occur after the signal is processed through the speech encoder 104. That is, channel encoder 105 makes the signal more robust by adding redundant bits to the signal. For example, in a wireless phone implementing the original GSM technology, a typical bit rate at the output of the speech encoder might be about 13 kilobits (kb) per second, whereas, a typical bit rate at the output of the channel encoder might be about 22 kb/sec. The bits added by channel encoder 105 do not carry information about the speech; but make the signal more robust and help to reduce the bit errors.

The modulator 106 combines the digital signals from the channel encoder into symbols, which become an analog wave form. Finally, RF module 107 translates the analog wave forms into radio frequencies, and then transmits the RF signal via antenna 108 to another telephone.

Third generation (3G) phones, operate in a similar manner to 2G phones except 2G phones operate on a narrowband cellular network where speech is sampled at 8 kHz, and 3G phones operate on a wideband cellular network where speech is sampled at 16 kHz. While a 2G phone is not configured to work on a wideband network, 3G phones are configured to work on either a wideband network or a narrowband network to take advantage of the existing narrowband infrastructure.

Figure 2:
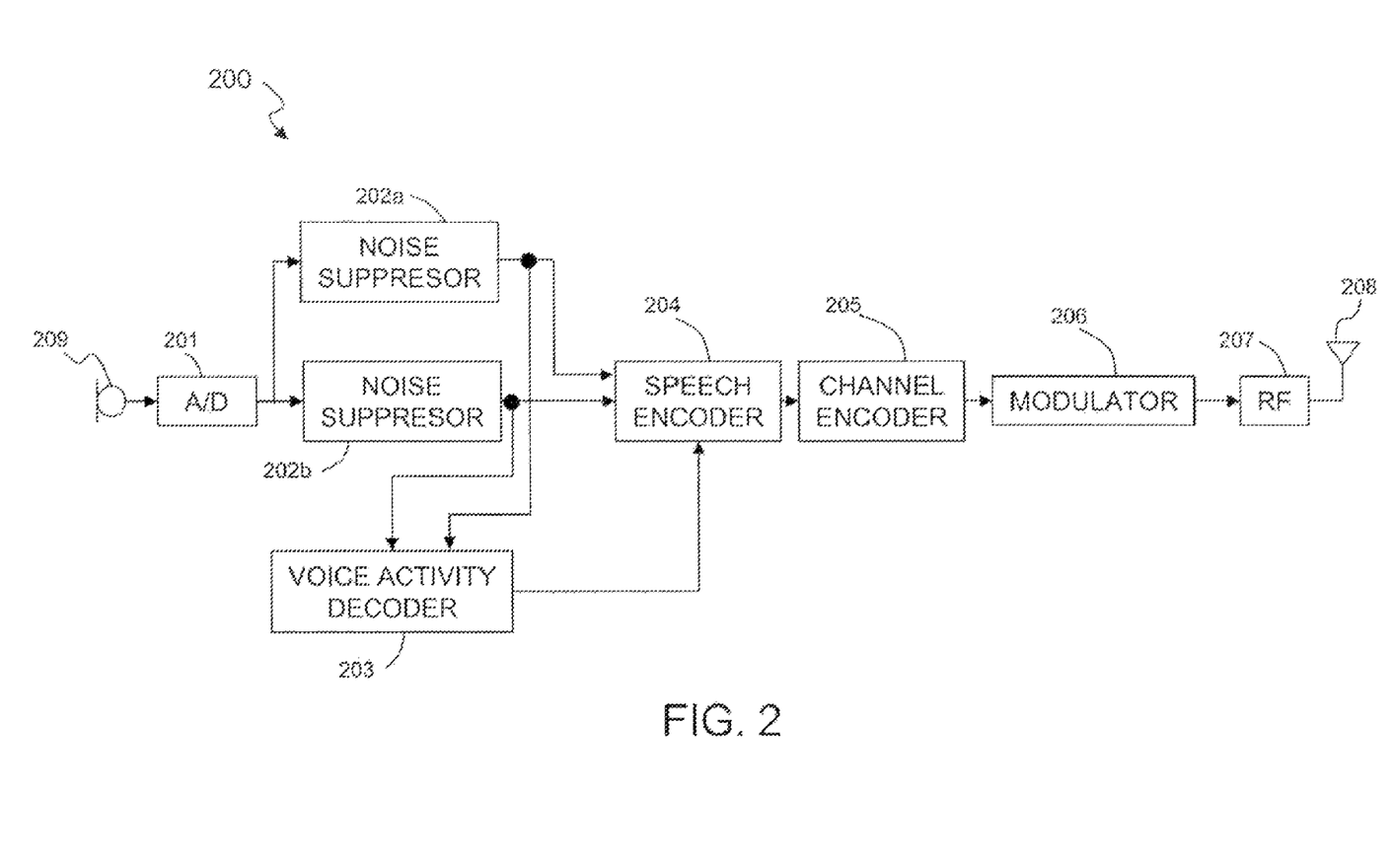
FIG. 2 is a functional block diagram of a transmit path of a conventional third generation digital wireless telephone.

FIG. 2 is a functional block diagram of a transmit path 200 of a conventional 3G digital wireless telephone. Similarly to the 2G phones, transmit path 200 includes a microphone 209, A/D converter 201, a first noise suppressor 202a configured to suppress noise in a narrowband network, a VAD 203, a speech encoder 204, a channel encoder 205, a modulator 206, an RF module 207, and an antenna 208. Transmit path 200 also includes a second noise suppressor 202b configured to operate in a 3G network by suppressing noise in a signal sampled in a wideband network.

Speech is processed and transmitted by 3G phones in a similar manner as it is processed and transmitted by a 2G phone. While operating on a wideband cell network, microphone 209 receives the voice of the near-end user and outputs a corresponding audio signal. A/D converter 201 converts the audio signal from an analog form to a digital form, which is then processed by second noise suppressor 202b.

When a 3G phone moves from a wideband cell network to a narrowband cell network, the 3G phone switches to narrowband operation. Among other things, the switch from wideband to narrowband operation results in a hard switch from the second noise suppressor 202b to the first noise suppressor 202a. The hard-switching method includes stopping the wideband noise suppressor 202b and turning on the narrowband noise suppressor 202a. This startup of the narrowband noise suppressor 202a requires the generation of new coefficient estimates as it cannot use the coefficients previously generated by the wideband noise suppressor 202b because the wideband noise suppressor 202b is configured to operate on a 3G network operating at 16 kHz whereas the narrowband noise suppressor 202a is configured to operate on a 2G network operating at 8 kHz.

Since the narrowband noise suppressor 202a has no coefficients to utilize, it begins to process the speech signal in the same way the wideband noise suppressor 202b began generating coefficients when the call was initially placed. The speech estimate of the noise suppression algorithm of the narrowband noise suppressor 202a is initialized at zero and the noise estimate is set to a predetermined value. After initializing, the narrowband noise suppressor 202a takes approximately 1.5-2 seconds before it delivers a clean speech output. This delay in outputting a clean signal occurs even though the ambient noise usually remains fairly constant while a user moves from a 2G network to a 3G network.

Figure 3A:
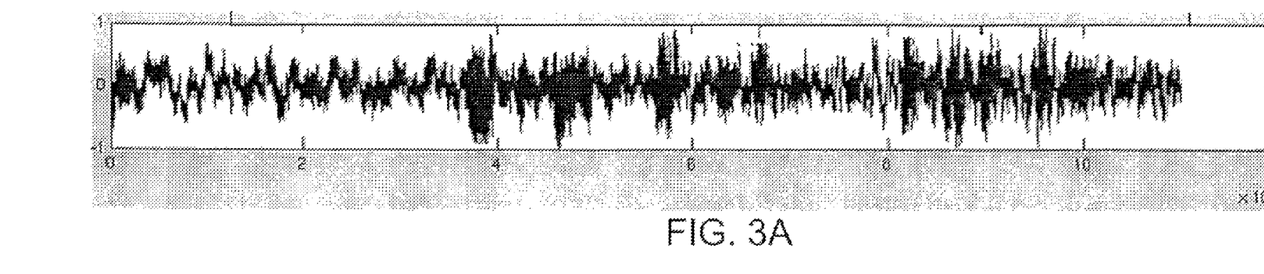
FIG. 3A is an amplitude versus sample graph of a noisy-input signal received by a noise suppressor.
Figure 3B:
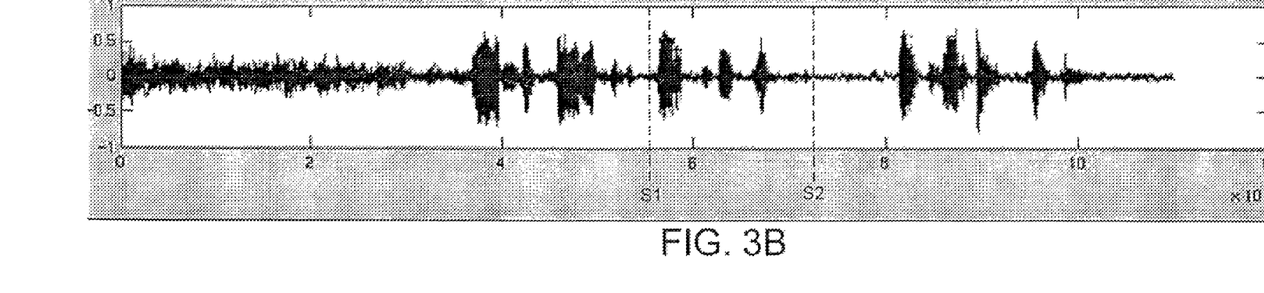
FIG. 3B is an amplitude versus sample graph of the noisy-input signal after it passes through a noise suppressor.
Figure 3C:
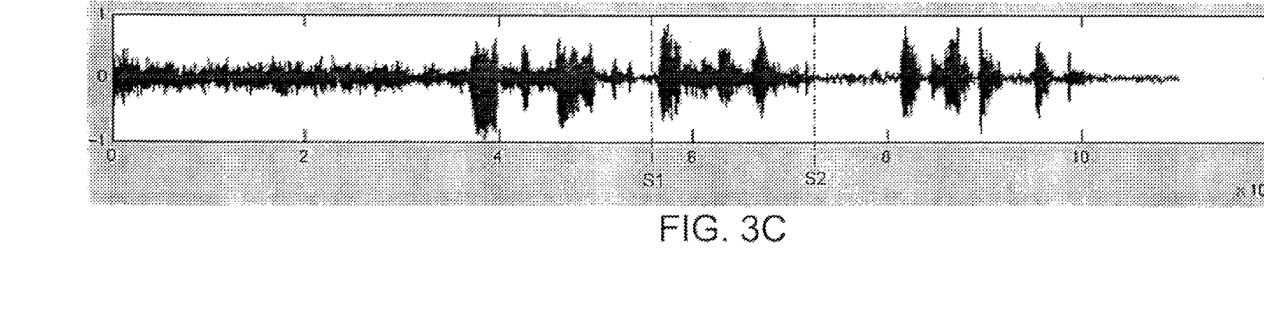
FIG. 3C is an amplitude versus sample graph of the noisy-input signal after it passes through two noise suppressors during a switch from a wideband network to a narrowband network.

FIGS. 3A-3C illustrate the increase in noise created by the hard switching noise suppression method. FIG. 3A is an amplitude versus sample graph of a noisy signal received from a microphone 109, 209. FIG. 3B is an amplitude versus sample graph of the noisy-input signal after it passes through noise suppressor 102. FIG. 3C is an amplitude versus sample graph of the noisy-input signal after it passes through the wideband noise suppressors 202b and narrowband noise suppressor 202a while a switching operation takes place at the 56960 sample, demarcated as S1. A comparison between FIGS. 3B and 3C shows an increase in the amount of noise present in the output signal from sample S1 to S2 in FIG. 3C. It is during this time from S1 to S2 that first noise suppressor 202a is turned on and begins generating new coefficients. This delay in delivering a clean speech output upon switching results in a degradation of speech quality by the far-end user with whom the near-end user is speaking.

Figure 4:
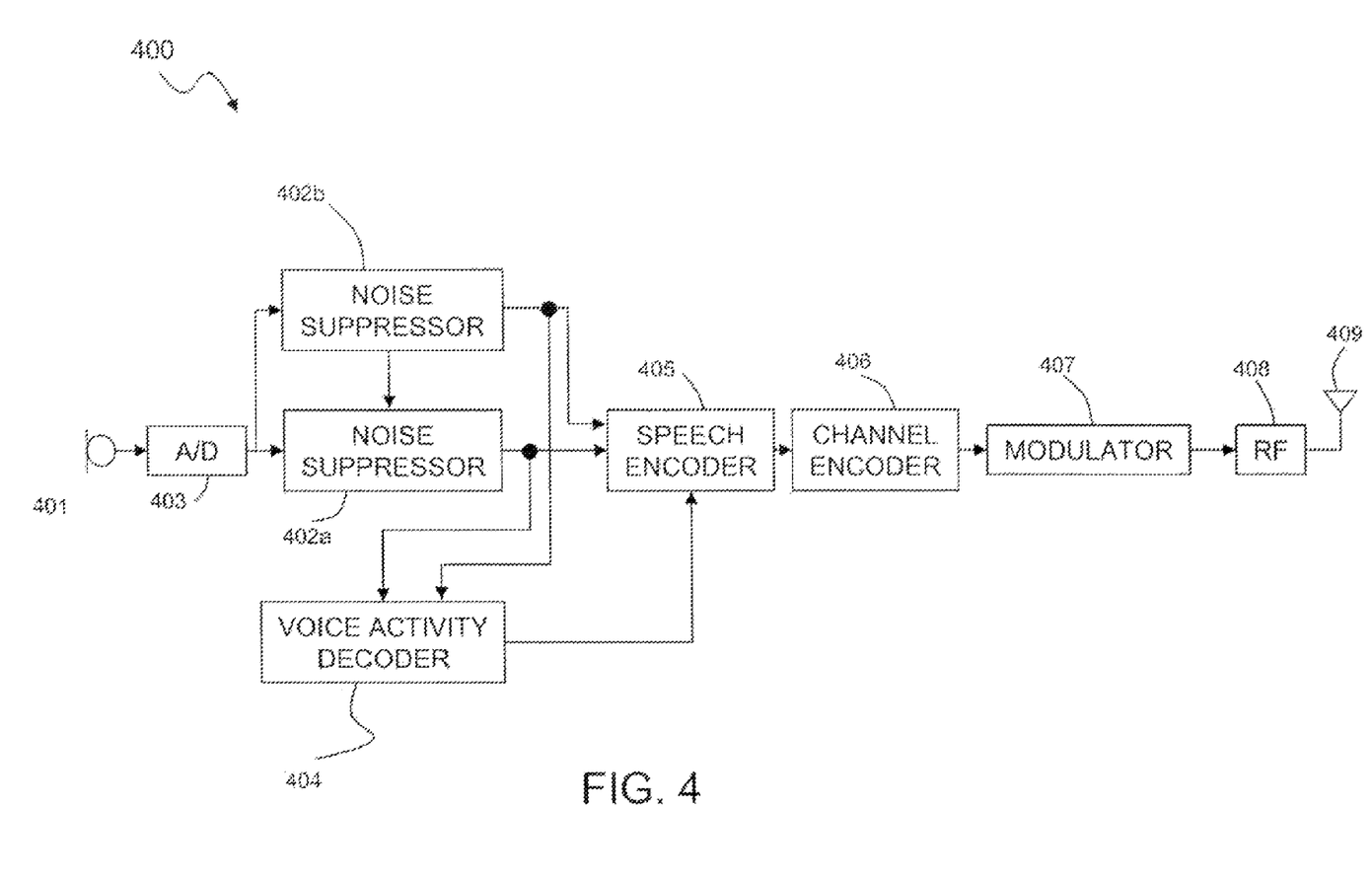
FIG. 4 is a functional block diagram of a transmit path in a third generation wireless telephone in accordance with an exemplary embodiment of the present invention.

FIG. 4 is a functional block diagram of a transmit path 400 of a third generation (3G) digital wireless telephone in accordance with an exemplary embodiment. Transmit path 400 includes a microphone 401, an A/D converter 403, a narrowband noise suppressor 402a, a wideband noise suppressor 402b, a voice activity decoder 404, a speech encoder 405, a channel encoder 406, a modulator 407, an RF module 408 and an antenna 409.

Microphone 401 receives the voice of a near-end user and outputs a corresponding audio signal to A/D converter 403. A/D converter 403 converts the analog audio signal from microphone 401 into a digital signal. The digital signal is then processed by either the narrowband noise suppressor 402a or wideband noise suppressor 402b depending if the phone is operating in a narrowband cell network or a wideband cell network, respectively.

The narrowband and wideband noise suppressors 402a and 402b are configured to implement a noise suppression algorithm. The noise suppression algorithm may be implemented in noise suppressors 402a and 402b in hardware, software or some combination thereof. First noise suppressor 402a is configured to implement a noise suppression algorithm for a speech signal sampled in a narrowband network sampled at, for example, 8 kHz, and second noise suppressor 402b is configured to implement a noise suppression algorithm in a wideband network sampled at, for example, 16 kHz.

The noise suppression algorithm may utilize spectral estimation of both the noisy-signal envelope, the envelope containing both speech and noise, and the noise envelope containing only noise. These two envelopes are separated using voice activity decoder 404 to determine when a telephone user is speaking into microphone 401. In one embodiment, spectral estimation utilizes a discrete Fourier transform (DFT). However, other transforms, such as a discrete cosine transform a Hartley transform and bilinear-transform that maps data to a Bark frequency scale may be implemented.

When a telephone call is initially placed, coefficients from the DFT have not been estimated. Therefore, the speech estimate is set at zero and the noise estimate is set to a predetermined default value. As the duration of the call increases, the noise suppression algorithm is more accurately able to estimate the coefficients, which define the noise component of the telephone signal. The accuracy of the coefficient estimates is increased by using a two-sided single-pole recursion method, where the term "two-sided" refers to separate time constants for following the data when it is going up and down. The cleaned audio signal is acquired by attenuating certain frequency bins by a function of the signal to noise ratio (SNR).

In an exemplary embodiment, wideband noise suppressor 402b is also configured to generate and transmit coefficient estimates for use by narrowband noise suppressor 402a upon the telephone switching from a wideband network to a narrowband network. The signal and noise estimates are carried out for each spectral bin upon a cell network switch. The switch from wideband to narrowband can create two distinct possibilities: (1) the telephone transfers from a wideband spectrum comprised of 128 bins to a narrow band spectrum of 64 bins or (2) the telephone transfers from a wideband spectrum of 64 bins to a narrowband spectrum of 64 bins.

In the first case, where the DFT is comprised of 128 bins in a wideband network and the phone is switching to a narrowband network with 64 bins, the coefficients for the narrowband noise suppressor 402a may be directly derived from the coefficients for the wideband noise suppressor 402b using the following equations:

Signal estimate: $s'(k)=s(k)$ where k=start, ..., stop

Noise estimate: $n'(k)=n(k)$ where k=start, ..., stop.

In the above equations, start and stop are the indices of the first and last active frequency bins, s', n' are narrowband estimates and s, n are wideband spectral estimates of the noisy-signal and noise signal, respectively.

Alternatively, when the telephone moves from a wideband network comprised of 64 bins to a narrowband network comprised of 64 bins, the coefficients may not be directly derived since the resolution in the wideband is twice the resolution of the narrowband. In this case, the narrowband DFT coefficients may be derived from the wideband DFT coefficients by using sinc interpolation. However, other methods of interpolation, such as linear-interpolation, may be used if needed. For example, if there is a shortage of computational resources available, then linear-interpolation may be utilized. In an exemplary embodiment, the narrowband DFT coefficients are derived from the wideband DFT coefficients by the following equations:

For 'r' is odd:

$$X'(r) = (1/N) \sum_{k=0}^{K=N-1} (X(k) * \mathrm{Sin}\Pi(r-2k)/2)/(\mathrm{Sin}\Pi(r-2k)/2N)$$

Where N is the size of DFT in wideband.

For 'r' is even:

$X'(r)=X(r/2)$

The above equations are used to calculate the signal estimate, noise estimate and pre-noise estimate, where r runs from 0 to N−1. Configuring the wideband noise suppressor 402b to generate coefficient estimates to be used by narrowband noise suppressor 402a upon switching from a wideband network to a narrowband network (smooth switching) reduces the amount of noise transmitted by the near-end telephone and heard by a far-end user.

Figure 5:
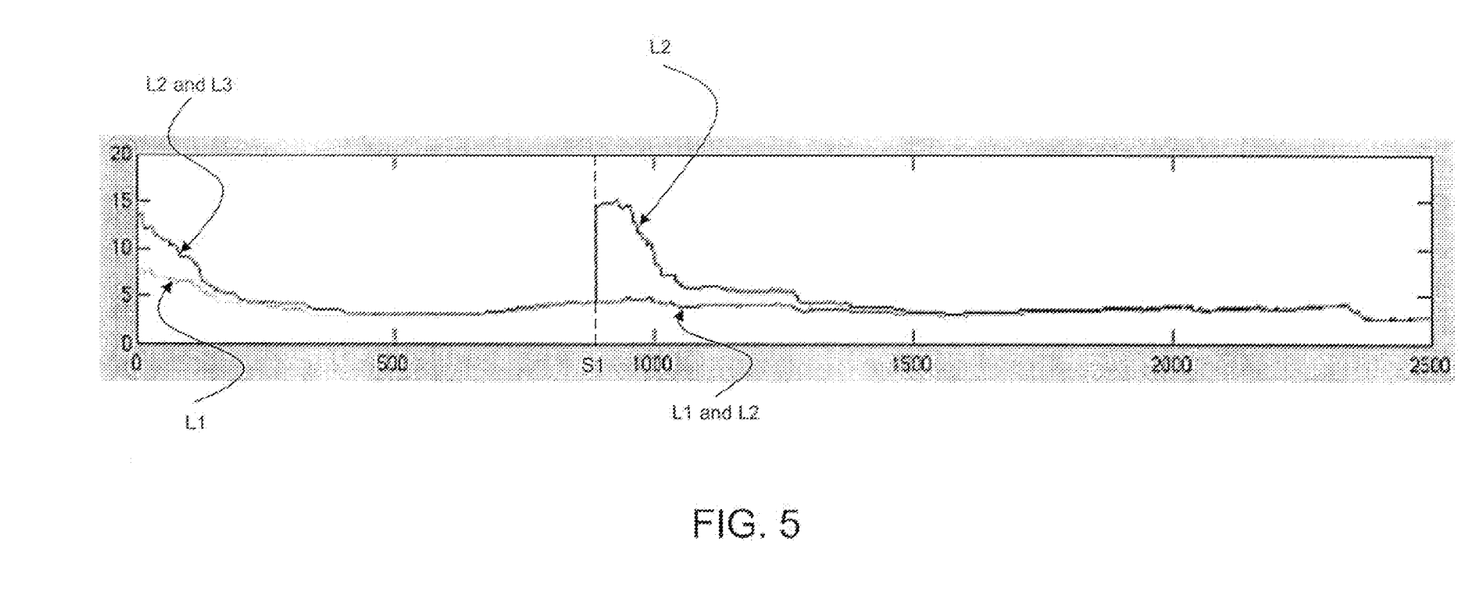
FIG. 5 is a noise estimate versus sample graph of the 1 kHz spectral bin.

FIG. 5 shows a frequency domain signal estimate in the 1 kHz frequency bin. Trace L1 corresponds to the magnitude of the 1 kHz frequency bin where a telephone does not undergo a switch from a wideband network to a narrowband network. Trace L2 is the magnitude of the 1 kHz frequency bin implementing a hard-switching noise-suppression method, and trace L3 is the magnitude of the 1 kHz frequency bin implementing a smooth-switching noise suppression in accordance with an exemplary embodiment. Both traces L2 and L3 switched from a wideband network to a narrowband network at sample 892, demarcated in FIG. 5 as S1. As shown in FIG. 5, trace L2 experiences a significant spike in magnitude at sample S1 as the telephone undergoes a network switching operation.

In contrast, trace L3 does not spike at sample S1 when the cell network switch occurs. As a result of having first-hand derived coefficient estimates, the smooth-switching noise-suppression method is able to accurately filter out the ambient noise picked up by the microphone 401. Since the ambient noise usually remains somewhat constant during the switch from one cell network to another, coefficient estimates generated by the wideband noise suppressor 402b before the switch provide an accurate estimation of the coefficients in the narrowband network after the switch.

Figure 6A:
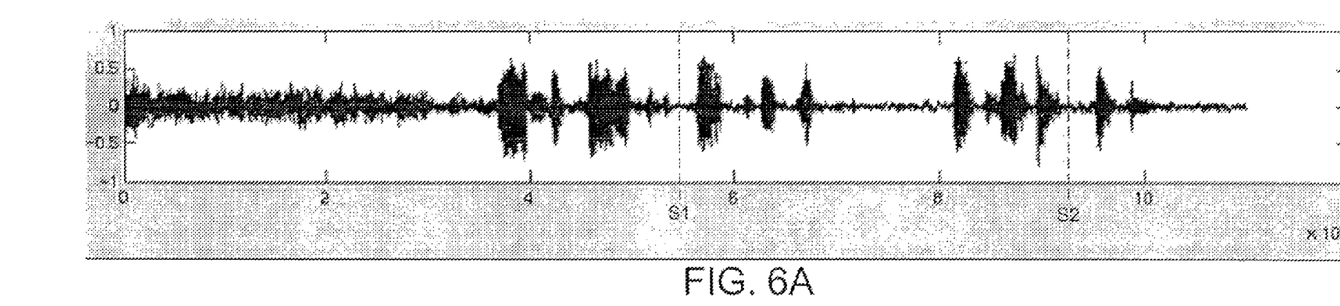
FIG. 6A is an amplitude versus sample graph of an output of a noise suppressor in telephone in a constant narrowband network.
Figure 6B:
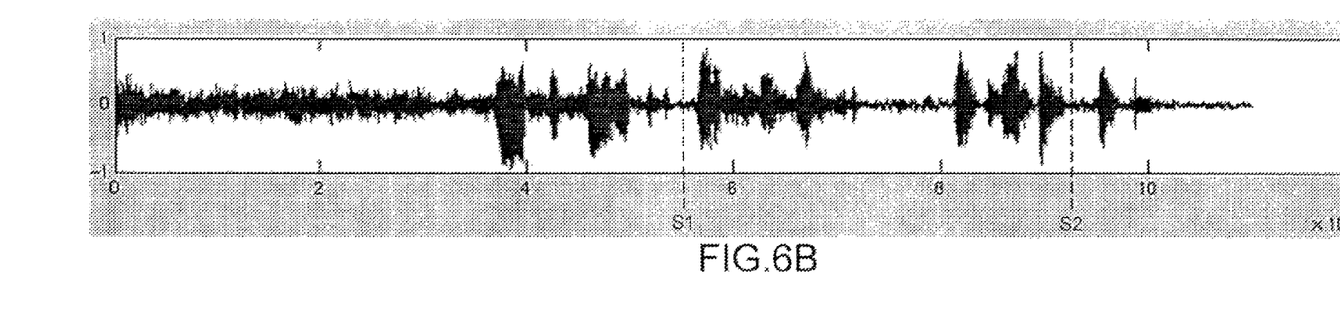
FIG. 6B is an amplitude versus sample graph of an output of a hard switching noise suppression method during a switch from a wideband network to a narrowband network.
Figure 6C:
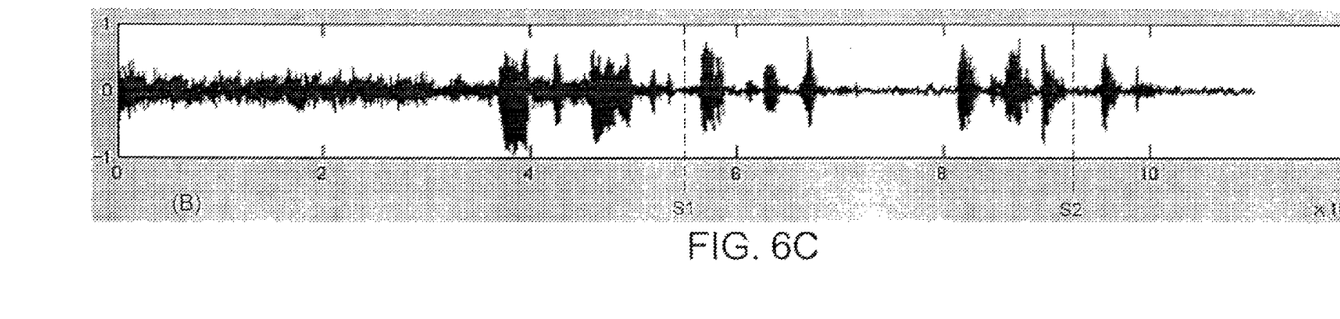
FIG. 6C is an amplitude versus sample graph of an output of a smooth switching noise suppression method during a switch from a wideband network to a narrowband network in accordance with an exemplary embodiment of the present invention.

FIGS. 6A-6C show a comparison of audio signals having been processed by various noise suppressors. The waveform in FIG. 6A is an audio signal that has passed through a noise-suppression method in a telephone that remains in one network and is an accurate representation of the speech audio signal. FIG. 6B shows a waveform that has passed through a conventional hard-switching noise-suppression method in a telephone that underwent a switch from a wideband network to a narrowband network at sample S1. FIG. 6C shows a waveform that passed through a smooth-switching noise-suppression method in accordance with an exemplary embodiment. The telephone in FIG. 6C also switched from a wideband network to a narrowband network at sample S1.

Comparing the waveforms in FIGS. 6A and 6B, the waveform in FIG. 6B is thicker than the waveform in FIG. 6A between samples S1 and S2. The increased thickness in the waveform is indicative of more noise being present in the signal. This increase in noise is transmitted by the near-end telephone to a far-end telephone reducing the clarity of the voice of the near-end user. The additional noise present in the signal in FIG. 6B is a direct result of the hard-switching noise-suppression method utilized in the telephone. Because the narrowband noise suppressor does not have accurate coefficient estimates at the time when the switch occurs, the noise suppressor must generate its own estimates by starting from predetermined values. The result is a period of approximately 1.5-2 seconds of increased noise in the audio signal when a telephone switches from a wideband network to a narrowband network.

In contrast, the waveform in FIG. 6C does not experience an increase in noise between samples S1 and S2 as the waveform in FIG. 6B. The smooth-switching noise-suppression method utilized in FIG. 6C does not experience the 1.5-2 second spike in noise level as a result of the switch from the wideband network to the narrowband network. This is a direct result of having coefficient estimates for the narrowband noise suppressor being generated from the coefficient estimates of the wideband noise suppressor.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method comprising the steps of,
applying noise suppression to a telephone signal using a first noise suppressor while operating a telephone in a first operating mode, the first noise suppressor generating an estimate of a noise component of the telephone signal;
switching the telephone from the first operating mode to a second operating mode;
providing the estimate of the noise component as an input to a second noise suppressor different from the first noise suppressor, when the switching step is performed; and
applying noise suppression to the telephone signal using the second noise suppressor by using the estimate of the noise component provided by the first noise suppressor when the switching step is performed.

2. The method of claim 1, wherein the first operating mode is wideband operation, and the second operating mode is narrowband operation.

3. The method of claim 2, wherein the first operating mode is 3G operation, and the second operating mode is 2G operation.

4. The method of claim 2, wherein the first operating mode uses a 16 kHz sample-rate, and the second operating mode uses an 8 kHz sample-rate.

5. The method of claim 1, wherein the step of applying noise suppression to the telephone signal using the second noise suppressor begins immediately upon execution of the switching step.

6. The method of claim 1, wherein the telephone is a wireless telephone, and the switching occurs when the telephone moves between a first cell and a second cell.

7. The method of claim 1, wherein:
the first noise suppressor generates a first set of coefficients for the estimate of the noise component of the telephone signal; and
the second noise suppressor uses the first set of coefficients to determine a second set of coefficients defining an estimate of the noise component of the telephone signal used by the second noise suppressor when the switching step is performed.

8. The method of claim 7, wherein the first set of coefficients and the second set of coefficients are coefficients for a transform from the group consisting of discrete Fourier transform, discrete cosine transform, Hartley transform, and bilinear-transform which maps data to Bark frequency scale.

9. The method of claim 8, wherein:
the first set of coefficients correspond to a first set of frequency bands, and the second set of coefficients correspond to a second set of frequency bands;
respective frequency bands in the second set of frequency bands are the same as a subset of the first set of frequency bands; and
the method includes setting coefficients corresponding to the frequency bands in the second set of frequency bands equal to the coefficients corresponding to the same frequency bands in the subset of the first set of frequency bands when the switching step is performed.

10. The method of claim 8, wherein:
the first set of coefficients correspond to a first set of frequency bands, and the second set of coefficients correspond to a second set of frequency bands;
a width of the frequency bands in the second set of frequency bands is less than a width of the frequency bands in the first set of frequency bands;
respective coefficients corresponding to a subset of the second set of frequency bands are set equal to the corresponding coefficients for a subset of the first set of frequency bands; and
interpolation is used to calculate coefficients corresponding to remaining ones of the second set of frequency bands.

11. A noise suppression system for a telephone comprising:
a first noise suppressor for applying noise suppression to a telephone signal while operating the telephone in a first operating mode, the first noise suppressor generating an estimate of a noise component of the telephone signal;
a second noise suppressor for applying noise suppression to the telephone signal while operating the telephone in a second operating mode, the second noise suppressor being different from the first noise suppressor;
the telephone switching from the first operating mode to a second operating mode;
the first noise suppressor providing the estimate of the noise component as an input to the second noise suppressor, when the telephone switches to the second operating mode;
the second noise suppressor applying noise suppression to the telephone signal by using the estimate of the noise component provided by the first noise suppressor when the switching step is performed.

12. The system of claim 11, wherein the first noise suppressor operates on a 3G telephone signal, and the second noise suppressor operates on a 2G telephone signal.

13. The system of claim 11, wherein the telephone is a wireless telephone, and the switching occurs when the telephone moves between a first cell and a second cell.

14. A computer readable storage medium encoded with computer program code, wherein when the computer program code is executed by a processor, the processor performs a method comprising the steps of:

applying noise suppression to a telephone signal using a first noise suppressor while operating a telephone in a first operating mode, the first noise suppressor generating an estimate of a noise component of the telephone signal;

switching the telephone from the first operating mode to a second operating mode;

providing the estimate of the noise component as an input to a second noise suppressor different from the first noise suppressor, when the switching step is performed; and applying noise suppression to the telephone signal using the second noise suppressor by using the estimate of the noise component provided by the first noise suppressor when the switching step is performed.

15. The computer readable storage medium of claim 14, wherein the first operating mode is wideband operation, and the second operating mode is narrowband operation.

16. The computer readable storage medium of claim 15, wherein the first operating mode is 3G operation, and the second operating mode is 2G operation.

17. The computer readable storage medium of claim 15, wherein the first operating mode uses a 16 kHz sample-rate, and the second operating mode uses an 8 kHz sample-rate.

18. The computer readable storage medium of claim 14, wherein the step of applying noise suppression to the telephone signal using the second noise suppressor begins immediately upon execution of the switching step.

19. The computer readable storage medium of claim 14, wherein the telephone is a wireless telephone, and the switching occurs when the telephone moves between a first cell and a second cell.

20. The computer readable storage medium of claim 14, wherein:

the first noise suppressor generates a first set of coefficients for the estimate of the noise component of the telephone signal;

the second noise suppressor uses the first set of coefficients to determine a second set of coefficients defining an estimate of the noise component of the telephone signal used by the second noise suppressor when the switching step is performed; and the first set of coefficients and the second set of coefficients are coefficients for a transform from the group consisting of discrete Fourier transform, discrete cosine transform, Hartley transform, and bilinear-transform which maps data to Bark frequency scale.

21. A method comprising the steps of, applying noise suppression to a telephone signal using a first noise suppressor while operating a telephone in a first operating mode, the first noise suppressor generating an estimate of a noise component of the telephone signal, wherein the first noise suppressor generates a first set of coefficients for the estimate of the noise component of the telephone signal;

switching the telephone from the first operating mode to a second operating mode;

providing the estimate of the noise component as an input to a second noise suppressor different from the first noise suppressor, when the switching step is performed; and applying noise suppression to the telephone signal using the second noise suppressor by using the estimate of the noise component provided by the first noise suppressor when the switching step is performed, wherein the second noise suppressor uses the first set of coefficients to determine a second set of coefficients defining an estimate of the noise component of the telephone signal used by the second noise suppressor when the switching step is performed.

22. A noise suppression system for a telephone comprising:

a first noise suppressor for applying noise suppression to a telephone signal while operating the telephone in a first operating mode, the first noise suppressor generating an estimate of a noise component of the telephone signal, wherein the first noise suppressor generates a first set of coefficients for the estimate of the noise component of the telephone signal;

a second noise suppressor for applying noise suppression to the telephone signal while operating the telephone in a second operating mode, the second noise suppressor being different from the first noise suppressor;

the telephone switching from the first operating mode to a second operating mode;

the first noise suppressor providing the estimate of the noise component as an input to the second noise suppressor, when the telephone switches to the second operating mode;

the second noise suppressor applying noise suppression to the telephone signal by using the estimate of the noise component provided by the first noise suppressor when the switching step is performed, wherein the second noise suppressor uses the first set of coefficients to determine a second set of coefficients defining an estimate of the noise component of the telephone signal used by the second noise suppressor when the switching step is performed.

23. A computer readable storage medium encoded with computer program code, wherein when the computer program code is executed by a processor, the processor performs a method comprising the steps of:

applying noise suppression to a telephone signal using a first noise suppressor while operating a telephone in a first operating mode, the first noise suppressor generating an estimate of a noise component of the telephone signal, wherein the first noise suppressor generates a first set of coefficients for the estimate of the noise component of the telephone signal;

switching the telephone from the first operating mode to a second operating mode;

providing the estimate of the noise component as an input to a second noise suppressor different from the first noise suppressor, when the switching step is performed; and applying noise suppression to the telephone signal using the second noise suppressor by using the estimate of the noise component provided by the first noise suppressor when the switching step is performed, wherein the second noise suppressor uses the first set of coefficients to determine a second set of coefficients defining an estimate of the noise component of the telephone signal used by the second noise suppressor when the switching step is performed.

* * * * *